US012528218B2

(12) United States Patent
Monteiro et al.

(10) Patent No.: US 12,528,218 B2
(45) Date of Patent: Jan. 20, 2026

(54) CUTTING AND DRAWING MANUAL ORBITAL MACHINE OF THE PIPE PRESERVATION SYSTEM

(71) Applicants: PETRÓLEO BRASILEIRO S.A.—PETROBRAS, Rio de Janeiro (BR); INSTITUTO DE PESQUISAS TECNOLÓGICAS DO ESTADO DE SÃO PAULO S.A., São Paulo (BR)

(72) Inventors: Murilo Costa Monteiro, Rio de Janeiro (BR); Mario Henrique Fernandes Batalha, São Paulo (BR); Leandro Aparecido Da Silva Albino, São Paulo (BR); Alessandro Guimarães, São Paulo (BR)

(73) Assignees: PETRÓLEO BRASILEIRO S.A.—PETROBRAS, Rio de Janeiro (BR); INSTITUTO DE PESQUISAS TECNOLÓGICAS DO ESTADO DE SÃO PAULO S.A., São Paulo (BR)

( * ) Notice: Subject to any disclaimer, the term of this patent is extended or adjusted under 35 U.S.C. 154(b) by 262 days.

(21) Appl. No.: 18/306,095

(22) Filed: Apr. 24, 2023

(65) Prior Publication Data
US 2023/0339132 A1 Oct. 26, 2023

(30) Foreign Application Priority Data
Apr. 25, 2022 (BR) ...................... 10 2022 007845 9

(51) Int. Cl.
*B26D 1/43* (2006.01)
*B26D 3/08* (2006.01)

(52) U.S. Cl.
CPC ................. *B26D 1/43* (2013.01); *B26D 3/08* (2013.01)

(58) Field of Classification Search
CPC .................................. B26D 1/43; B26D 3/08
See application file for complete search history.

(56) References Cited

U.S. PATENT DOCUMENTS 3,443,648 A * 5/1969 Howard .................... E21B 4/18
299/71
4,345,376 A 8/1982 Benson et al.
(Continued)

FOREIGN PATENT DOCUMENTS

| BR | 102019015918 | 2/2021 |
|----|--------------|--------|
| DE | 20209579 U1 | 10/2003 |
| WO | WO 93/002825 | 2/1993 |

*Primary Examiner* — Sean M Michalski
(74) *Attorney, Agent, or Firm* — Knobbe, Martens, Olson & Bear, LLP

(57) ABSTRACT

The present invention refers to a machine for cutting the external coating for drawing the Coated Pipe Preservation System for Onshore and Subsea Pipelines, called PPS System or PPS for short (FIGS. 1, 1.1 to 1.4). This Machine, called the Cutting and Drawing Manual Orbital Machine of the PPS (FIGS. 7 to 9), performs the cut at the angle (β) (2.4), executes the FBE Exposure Band (FBE Tail) (2.3), simultaneously, and draws the PPS System, in order to ensure that the Collar (Cutback) (2.2) meets the specifications regarding the finishing of the Chamfer (2.4) at the interface with the external coating of the pipe, its Length (C) (2.6) and the Width (T) of the FBE Exposure Band (FBE Tail) (2.7).

The equipment performs cutting with the pipe being static (immovable), and is applicable to pipes externally coated in three layers (3 Layer Coating), used in Onshore Pipelines (Buried Pipelines) or Subsea Pipelines (Subsea or Submerged Pipelines). It uses the PPS System to couple to the pipe, it is demountable, portable and can be manually operated without using any power source or using a commercial screwdriver.

19 Claims, 9 Drawing Sheets

(56) References Cited

U.S. PATENT DOCUMENTS

| | | | | |
|---|---|---|---|---|
| 4,576,070 | A * | 3/1986 | Fitzgerald | B23D 21/14 30/103 |
| 4,791,716 | A * | 12/1988 | Konrad | F16L 19/10 29/520 |
| 7,429,153 | B2 | 9/2008 | Dole et al. | |
| 7,574,807 | B1 * | 8/2009 | Fuller | B23D 45/128 30/103 |
| 8,220,371 | B2 * | 7/2012 | Benson | B23B 5/162 30/96 |
| 8,720,070 | B2 | 5/2014 | Sterner | |
| 10,393,368 | B2 * | 8/2019 | Smith | F22B 37/58 |
| 10,464,144 | B2 * | 11/2019 | Choi | B23C 3/122 |
| 2011/0108149 | A1 * | 5/2011 | Xiao | F16L 15/06 138/109 |
| 2012/0017377 | A1 * | 1/2012 | Hayden | B25H 7/005 7/157 |
| 2012/0308321 | A1 * | 12/2012 | Onishi | G21C 17/017 408/81 |
| 2020/0200004 | A1 * | 6/2020 | Wang | E21B 47/024 |
| 2023/0364819 | A1 * | 11/2023 | Monteiro | B26D 1/04 |
| 2023/0381873 | A1 * | 11/2023 | Monteiro | B26D 3/282 |
| 2024/0001451 | A1 * | 1/2024 | Monteiro | B23B 5/08 |

* cited by examiner

FRONT VIEW    SIDE VIEW

SECTION A-A

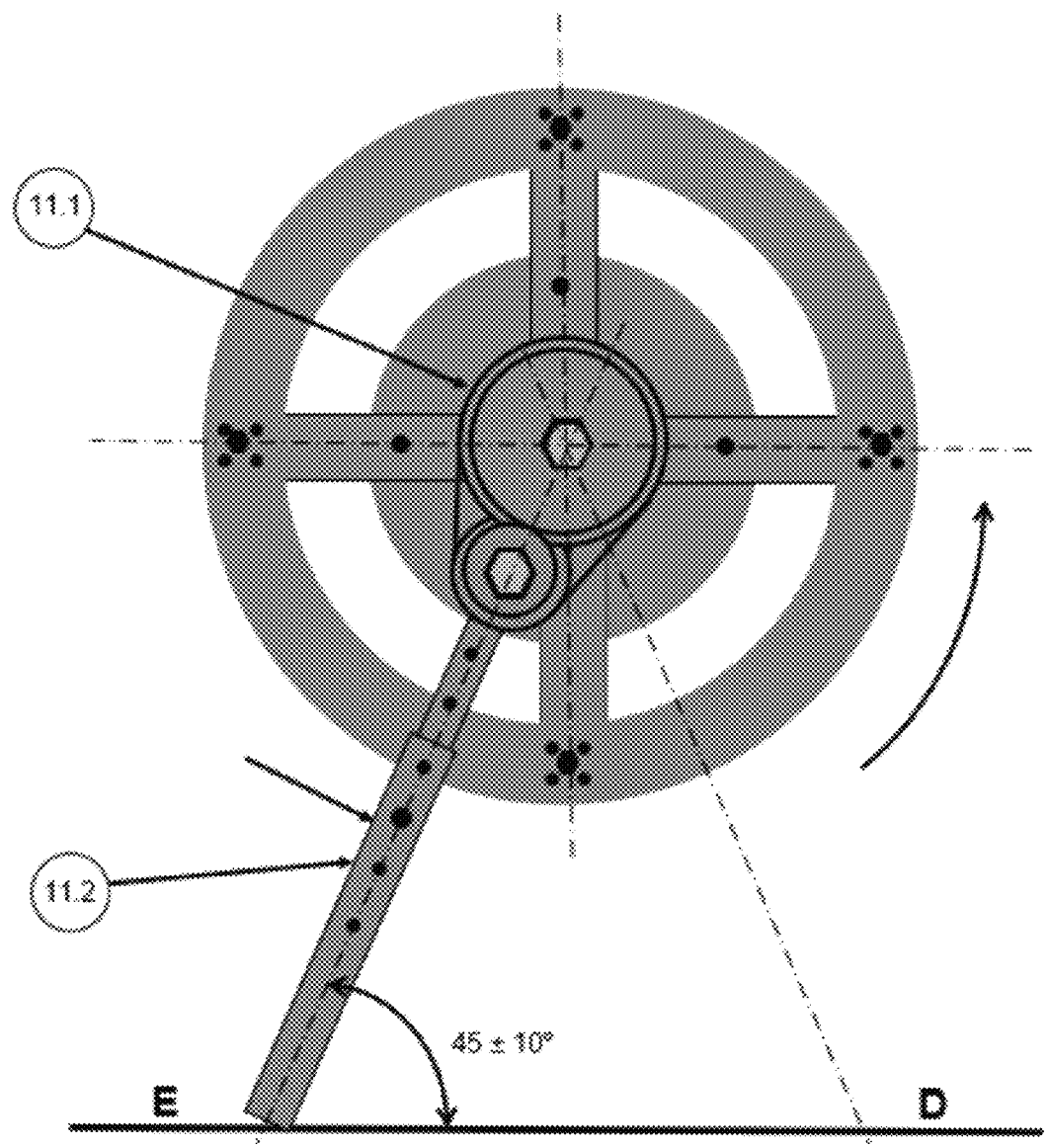

CUTTING AND DRAWING MANUAL ORBITAL MACHINE OF THE PIPE PRESERVATION SYSTEM

FIELD OF THE INVENTION

The present invention refers to the field of Pipeline Systems, which encompasses Subsea/Submerged Pipelines, in salt or fresh water, and Buried/Terrestrial Pipelines (Buried Pipelines), for application in the field of Oil and Gas, Mining, Sanitation, Water Supply, among others, which use externally coated carbon steel pipes for anticorrosive protection (External Anticorrosive Coating), in three layers of polyethylene (PE) or Polypropylene (PP) (3-Layer PE or 3-Layer PP Coating).

DESCRIPTION OF THE STATE OF THE ART

Carbon steel pipes, when installed in salt or fresh water, called Subsea or Submerged Pipelines, or onshore, called Buried or terrestrial pipelines (Buried Pipelines), require external anticorrosion protection (External Anticorrosive Coating). In this specific case, it is a Polyethylene coating in three layers (3-Layer PE Coating) and Polypropylene in three layers (3-Layer PP Coating), the former being generally used in Onshore Pipelines and the latter in Subsea Pipelines. The term Three Layers (3-Layer) corresponds to the 3-Layer PE Coating, a first layer of thermally curable Epoxy powder (FBE—Fusion Bonded Epoxy), a second layer of Copolymer Adhesive, and a third layer of Polyethylene (PE). For the 3-Layer PP Coating, the same first and second layers as for the 3-Layer PE Coating are used; however, the third layer is Polypropylene (PP). An easy way to identify them is by the color of the external coating; in general, Polyethylene (PE) is manufactured in black and Polypropylene in white.

The external anticorrosive coating of steel pipes in three layers (3-Layer) for onshore and underwater pipelines is manufactured in coating plants installed in Brazil, in accordance with Brazilian standards ABNT NBR 15221-1: External Anticorrosive Coating—Part 1: Polyethylene in three layers and ABNT NBR 15221-2: External Anticorrosive Coating—Part 2: Polypropylene in three layers. Abroad, the standard applied in most countries is ISO 21809-1—Petroleum and Natural Gas Industries, External Coating for Buried and Submerged Pipelines used in Pipeline Transportation Systems—Part 1—Polyolefin Coatings (3-Layer PE and 3-Layer PP).

The aforementioned Brazilian Standards define in Item 3.6, Collar (Cutback) as: "Extensions of the pipes, from the face of the bevel to the polyethylene or polypropylene, located at both ends, which are left free of coating". The Collar (Cutback), represented in FIG. 2 (2.2), has the main purpose of ensuring that the heat input generated during the welding of the joint that joins 2 (two) pipes does not damage its external coating. It is additionally intended for the coupling of the semi-automatic or automatic welding machine, the ultrasound equipment, in addition to being the scanning area for inspection of the weld.

The FBE Exposure Band (FBE Tail), represented in FIG. 2 (2.3), is intended to mitigate coating detachment at the steel/coating interface and promote an overlap of the field joint coating system. The chamfer angle (β), represented in FIG. 2 (2.4), is the angle in relation to the surface of the pipe, in the longitudinal direction, in order to allow the correct accommodation of the field joint. As can be seen, the Collar (Cutback) (2.2) only needs and must be exposed at the time of coupling for the welding.

The essential condition, required by current standards and specifications, is that the chamfer (2.4) of the Collar (Cutback), after cutting, is at the correct angle (β), less than 30° and its Length (C), represented in FIG. 2 (2.6) is in the specified measure, being the standard defined in the aforementioned Brazilian Standards of 120±10 mm. However, the buyer can specify longer or shorter and even different lengths at one end and the other.

The FBE Exposure Band (FBE Tail) (2.3), when specified by the buyer, must ensure that the entire layer of Copolymer Adhesive (second layer) is removed without causing damage to the FBE layer, in the specified width (T), represented in FIG. 2 (2.7). The Width (T) of this band varies according to the specifications of the buyers, with some from 1 to 5, and others from 5 to 20 mm in width.

The current practice continues to be the making of the Collar (Cutback), (2.2), by the brushing method. The pipe is coated in its entirety and, at the end of the production line, its ends are brushed, removing all three layers of the applied external coating, eliminating the roughness profile obtained in the blasting process, carried out by two blasting machines, generating waste (of low added value for recycling), noise, dust, and projection of wires from the steel brushes in a process that is often a bottleneck in the production line. The cost of frequent replacement of the steel brush pack used in the process is relevant. In addition, after all this process, the FBE Exposure Band (FBE Tail) (2.3) is machined at each end of the pipes, adding more time and cost to the process.

The manufacturing of the Collar (Cutback) by the brushing method, with regard to the finish of its chamfer, has two disadvantages: the first concerns the process, which is very aggressive, frays the coating and causes stresses, which when added to the thermal stresses generated in the coating process, rapid heating and cooling, result, over time, in the detachment of the coating in the transition region, coating and Collar (Cutback), represented in FIG. 2 (2.2). The second disadvantage is that the surface is not uniform, preventing a correct accommodation of the field joint. When pipes are stored in open-air, without an effective protection by the Collar (Cutback), this phenomenon tends to intensify, due to variations in temperature and humidity, since each layer of the coating and the pipe have different coefficients of expansion and will move searching for stabilization, which will cause the coating to peel off, allowing oxygen to enter under the FBE layer, initiating the corrosive process.

The FBE Exposure Band (FBE Tail) (2.3), made by machining, after brushing, aims at mitigating this problem and ensure the overlap of the field joint in the region, in order to make a smooth transition, avoiding void spaces that could favor the entry of oxygen, initiating the corrosion process, or causing loss of efficiency in the cathodic protection system. However, as the machining is done soon after coating and brushing the pipe, the stresses remain, and the layers will tend to move over time. For this reason, the term mitigate was used.

In order to solve the problem of brushing and to preserve and protect the ends of the pipes, the Preservation System of Coated Pipes for Onshore and Subsea Pipelines was created, called PPS or PPS System for short. This System and Method, protected by document BR102019015918-9 A2, represented in section in FIG. 1, which preferably encompasses carbon steel pipes externally coated with Polyethylene in three layers (3-Layer PE) and Polypropylene in three layers (3-Layer PP), with Outer Diameter (OD) (1.13), ranging from 114.3 to 812.8 mm (4½ to 32 inches) and with Wall Thicknesses (eP) (1.11), ranging from 6.35 to 50.8 mm (¼ to 2 inches). To achieve this objective, the system is made up of the following elements: a Cup (1.1), a Seal (1.2), a Cover (1.3), and the External Coating (1.4), so that all components will be inserted along the coating method. This system promotes an increase in the useful life of coated pipes when they are stored in the environment (in open-air), in addition to reducing the assembly time, resulting in savings in construction and installation costs.

Accordingly, the technical advantages obtained have direct or indirect effects on the manufacturing, storage and assembly process, eliminating recurrent losses due to corrosion during storage, reducing the cost of the blasting process in the field, eliminating the Collar (Cutback) brushing operation at the factory, and reducing the time to prepare the Collar (Cutback) surface, consequently reducing the bottleneck in releasing the joints in the field and mitigating the environmental impact by reducing the blasting time in the field or on the vessel. In this context, it is necessary to use efficient, low-cost and reliable Cutting Machines to ensure the effectiveness of the PPS System, the objective of this invention. Following this logic, it is concluded that the use of the Cutting and Drawing Manual Orbital Machine of the PPS will contribute to obtaining the productivity, economic, reliability, safety and environmental gains provided for in document BR102019015918-9 A2.

With the elimination of brushing the Collar (Cutback) of coated pipes proposed in the aforementioned document, there is a need to develop a machine that cuts the coating to remove the PPS System. This cut must meet the angle required by the standard and guarantee the FBE Exposure Band (FBE Tail) when specified by the buyer. In addition, it must meet productivity requirements, being faster and more economical than the activities it will eliminate or replace.

There are several means for machining the coating and executing the FBE Exposure Band (FBE Tail). The difference is that there is a need for a specific machine to accurately and quickly cut and draw the PPS System, in the field, for the construction and assembly of Onshore Pipelines (Buried Pipelines), or in the vessel or onshore base (Spoolbase), for the Construction and Installation of Subsea Pipelines (Subsea or Submerged Pipelines), without causing damage to the pipe surface or to the FBE (Fusion Bonded Epoxy) layer.

Document WO1993002825A1 addresses to a pipe cutter used particularly for non-metallic pipes, said cutter being designed not to cause deformations in the pipe during the cut. The cutter has an attachment sleeve, a cutting assembly which is capable of rotating a guide sleeve, and three support legs connected to the attachment sleeve. It is said that the attachment sleeve is divided into two parts, so that it can be opened to receive a pipe to be cut and closed to clamp the pipe to be cut. Furthermore, the cutting assembly has a blade and means for adjusting the cutting depth of the pipe, said cut being performed by the rotating movement of the cutting assembly.

U.S. Pat. No. 7,429,153B2 discloses a tool for cutting a chamfer on a pipe end, said tool comprising a housing with a hole to receive the end of said pipe, a ring positioned inside the housing substantially concentric with said hole, a slot in said ring forming a pair of ends, a cutting edge positioned at one end, the cutting edge engaging the end of the pipe, when the end of the pipe is received within the hole, the tool and the end of the pipe being rotatable relative to the shaft in question to cut the chamfer, and a thrust flange, the thrust flange engaging the pipe end, after the chamfer cutting is completed.

U.S. Pat. No. 10,464,144B2 discloses a pipe cutting and chamfering machine comprising a main body portion with a central portion through which a pipe passes to be attached, a cutting unit coupled to the main body portion and configured to cut or chamfering the pipe by means of a cutting blade while the cutting unit is orbiting around the attached pipe, an inlet adjustment plate attached to the cutting unit, an inlet control unit configured to perform movement of the input adjustment plate.

The prior arts disclose devices used in pipe cutting; however, none of them are able to perform satisfactorily on pipes with the Preservation System of Coated Pipes for Onshore and Subsea Pipelines (PPS).

The Preservation System of Coated Pipes for Onshore and Subsea Pipelines (PPS), protected in document BR102019015918-9 A2, called the PPS System, is unprecedented, and for this reason the Cutting Machine described in this invention as well, since the System foresees the cut for its removal and the Machine is designed for that purpose. There are several apparatuses, devices and machines for machining the FBE Exposure Band (FBE Tail); however, all use the Collar (Cutback) brushed or obtained by masking adhesive tape. In both cases, the machining of the external coating starts from the end of the pipe towards the center, being performed only by the manufacturer (coater).

In view of the difficulties present in the abovementioned State of the Art, and for PPS cutting and drawing solutions, the need arises to develop a technology capable of performing effectively and that is in accordance with environmental and safety guidelines. The referenced documents do not have the unique features that will be presented in detail below.

OBJECTIVE OF THE INVENTION

It is an objective of the invention to develop equipment that enables the cutting of the external coating of externally coated carbon steel pipes with their ends preserved and protected by the Preservation System of Coated Pipes for Onshore and Subsea Pipelines (PPS), to the removal of this Protection System.

BRIEF DESCRIPTION OF THE INVENTION

The present invention refers to a piece of equipment called PPS Cutting and Drawing Manual Orbital Machine, represented in FIGS. 7 to 9. This was developed to make the chamfer, close to the end of the External Flap of the Cup Component of the PPS System, represented in FIGS. 1 (1.5) and 3 (3.8), with an angle (β) of less than 30° in relation to the outer surface of the pipe, in the longitudinal direction, represented in FIG. 1 (1.5) and simultaneously make the FBE Exposure Band (FBE Tail), represented in FIG. 2 (2.3), and, subsequently, manually draw the PPS System, as represented in FIG. 10.

The Cutting and Drawing Manual Orbital Machine of the PPS, represented in FIGS. 7 to 9, is attached to the Pipe through its Attachment Device, represented in FIG. 8. This Device connects to the PPS System (7.5), ensuring the alignment for the cutting operation.

The Attachment Device, represented in FIG. 8, has as one of its components the PPS System Cover (8.6), which forms a set with the Fitting Cylinder (8.5), ensuring a precise and firm coupling on the inner surface of the Cup component of the PPS System (7.5).

The Tiller, represented in FIG. 8 (8.8) is used to couple, attach the Attachment Device and to draw the PPS System after cutting, as represented in FIG. 10.

The Cutting and Drawing Manual Orbital Machine of the PPS, represented in FIGS. 7 to 9, is demountable and portable, facilitating its mobility in the field.

The Cutting and Drawing Manual Orbital Machine of the PPS, represented in FIGS. 7 to 9, can be operated manually, or using a hydraulic, pneumatic or electrical device. A standard commercial electric or battery powered screwdriver can be used to perform the turning in the cutting operation.

For Pipes with an Outer Diameter of 12 to 32 inches (323.9 to 812.8 mm), the use of the Reducer Arm, represented in FIG. 11, is foreseen, in order to reduce the effort to rotate the Cutting and Drawing Manual Orbital Machine of the PPS and supporting its shaft, represented in FIG. 8 (8.1), in order to guarantee the alignment in relation to the Center Line of the Pipe, represented in FIG. 7.

BRIEF DESCRIPTION OF THE DRAWINGS

The present invention will be described in more detail below, with reference to the attached figures which, in a schematic and non-limiting way of the inventive scope, represent examples of its embodiment. In the drawings, there are:

FIG. 11 representing the Reducer Arm to be used to rotate the Cage of the Cutting and Drawing Manual Orbital Machine of the PPS, when cutting the external coating of pipes with a Nominal Diameter (DN) above 10, which comprises the Reducer (11.1) and the Support Bar on the ground (11.2).

DETAILED DESCRIPTION OF THE INVENTION

Below, there follows a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

The present invention is applied to externally coated carbon steel pipes with their ends preserved and protected by the Coated Pipe Preservation System for Onshore and Subsea Pipelines, protected by document BR102019015918-9 A2, called, for short, PPS System or PPS. The invention refers to the Orbital Machine for Cutting the External Coating to remove this protection system; however, it is not limited to this, and may be used for other purposes.

The execution of the chamfer of the Collar (Cutback) by cutting proposed in this invention ensures a uniform and stress-free surface in the coating system, favoring preservation and anticorrosion protection. Cutting is done just before installation in the field or at sea, enough time for the layers to settle and there are no more residual stresses. The Bevel, represented in FIG. 2 (2.1) and the Collar (Cutback), represented in FIG. 2 (2.2), will be exposed only for the time necessary for coupling, welding and inspection, guaranteeing its protection and integrity until the application of the ultimate anticorrosion protection. The use of a sander, grinder, wire brush, or any other means of preparing the joint for welding is eliminated, as the Bevels and Collars will be made available, after cutting and drawing the PPS System, within the specified standards, without the need for any further adjustment or preparation.

Figure 2:
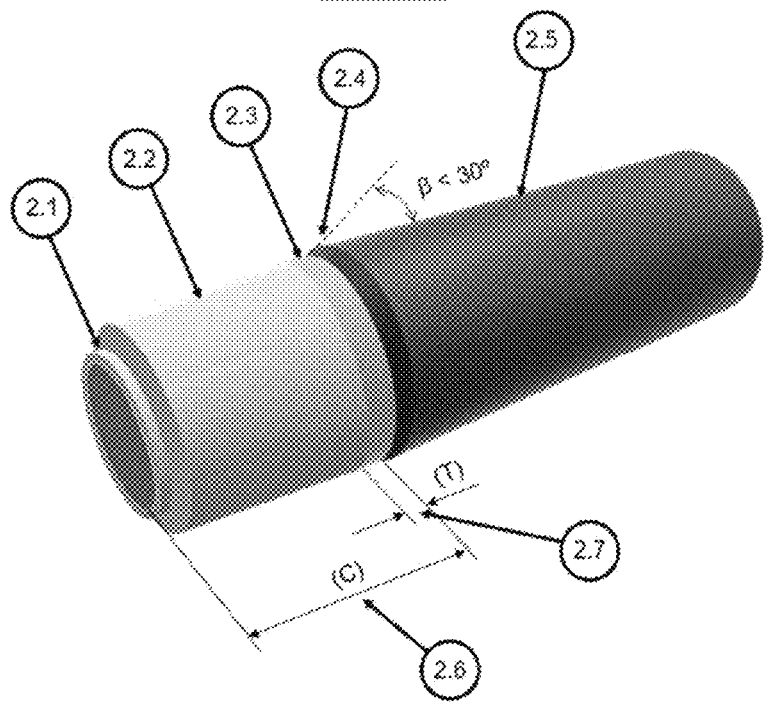
FIG. 2 representing the Collar (Cutback) of a pipe externally coated in three layers (3-Layer Coating), which comprises the Bevel (2.1), the Collar (Cutback) (2.2), the FBE Exposure Band (FBE Tail) (2.3), Bevel of the Collar (Cutback) (2.4), External Coating (2.5), Length (C) of the Collar (Cutback) (2.6) and Width (T) of the FBE Exposure Band (FBE Tail) (2.7)

FBE Exposure Band (FBE Tail), represented in FIG. 2 (2.3), is performed simultaneously with the cut, which is done without generating non-recyclable waste, favoring the environmental issue.

Figure 3:
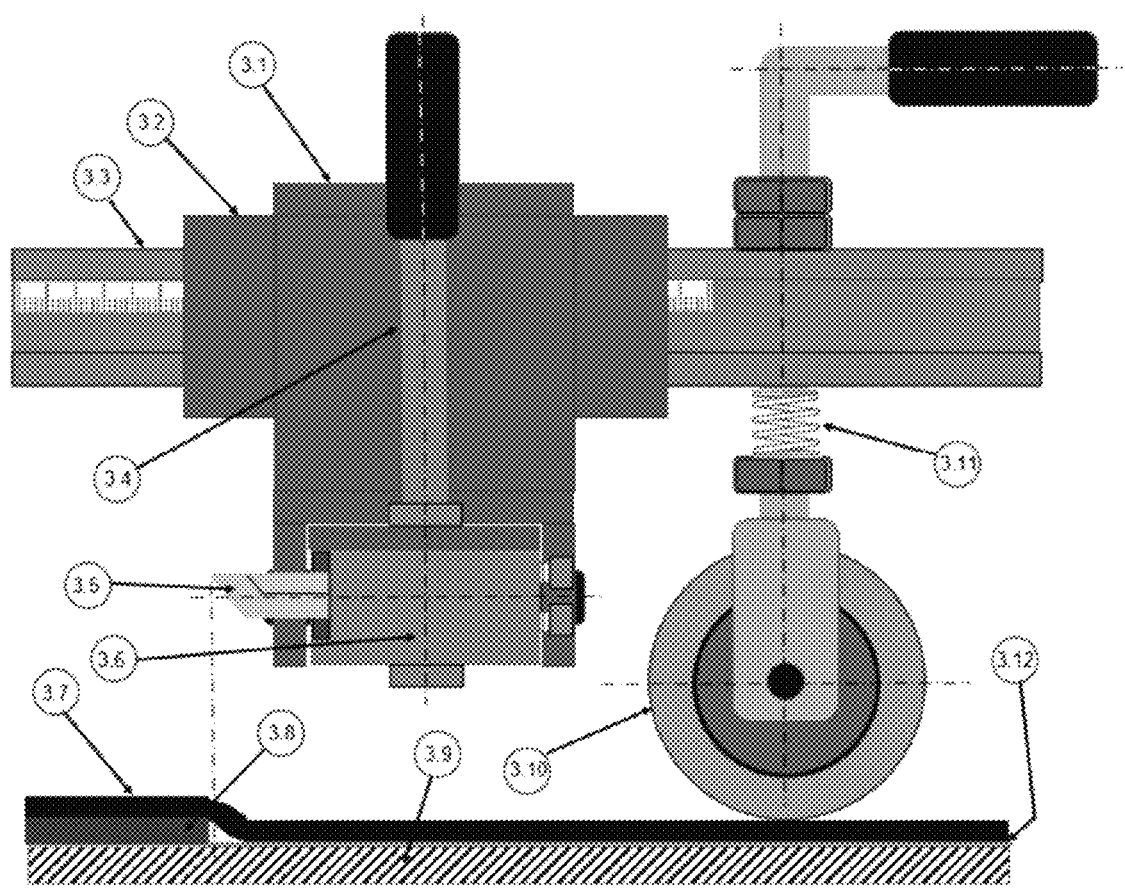
FIG. 3 representing the front view of the PPS Cutting Device with the PPS Cutting Blade in the retracted position, which comprises the Body (3.1), the Fitting Guide (3.2), the Bar (3.3), the PPS Cutting Lever (3.4), the PPS Cutting Blade (3.5), the PPS Cutting Blade Receptacle (3.6), the External Coating to be cut (3.7), the Outer Flap of the Cup (3.8), the Pipe Wall (3.9), the Support Wheel (3.10), the Support Wheel Spring (3.11) and the Epoxy Layer (FBE) (3.12)

The positioning of the PPS Cutting Blade, represented in FIGS. 3 (3.5), 4 (4.2), 5 (5.11) and 6 (6.3), with respect to the depth, will be carried out until it touches the first layer of Cured Epoxy Thermally (FBE), peeling off the second layer of Copolymeric Adhesive. To prevent excessive blade pressure on the FBE from peeling it, the PPS Cutting Device has a spring-loaded mechanism for adjustment and shock absorption. A cooperating factor is that the FBE Layer is smooth and cohesive, favoring the peeling process of the Copolymeric Adhesive (Second Layer), which has a minimum thickness of 200 µm (0.2 mm), both for the three-layer coating of Polyethylene (3-Layer PE) and for the three-layer coating of Polypropylene (3-Layer PP). The FBE Layer (First Layer) is 250−100+100 µm (0.15 to 0.35 mm) thick.

Figure 7:
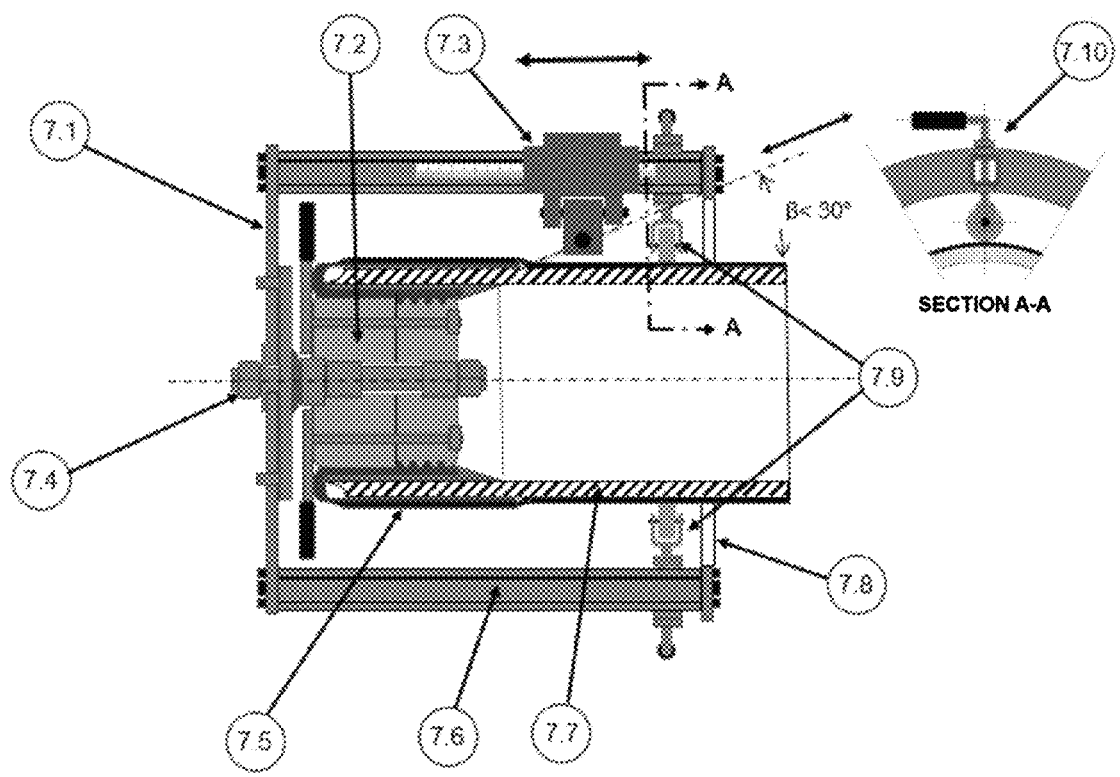
FIG. 7 representing the PPS Cutting and Drawing Manual Orbital Machine seen in section, which comprises the Cage Front Disc (7.1), the Attachment Device (7.2), the PPS Cutting Device (7.3), the Attachment Nut (7.4), the PPS System (7.5), the Bar (7.6), the Pipe (7.7), the Cage Rear Ring (7.8), the Support Wheels (7.9) and a sectional view (SECTION A-A) of one of the Support Wheels, illustrating its Lever (7.10)
Figure 8:
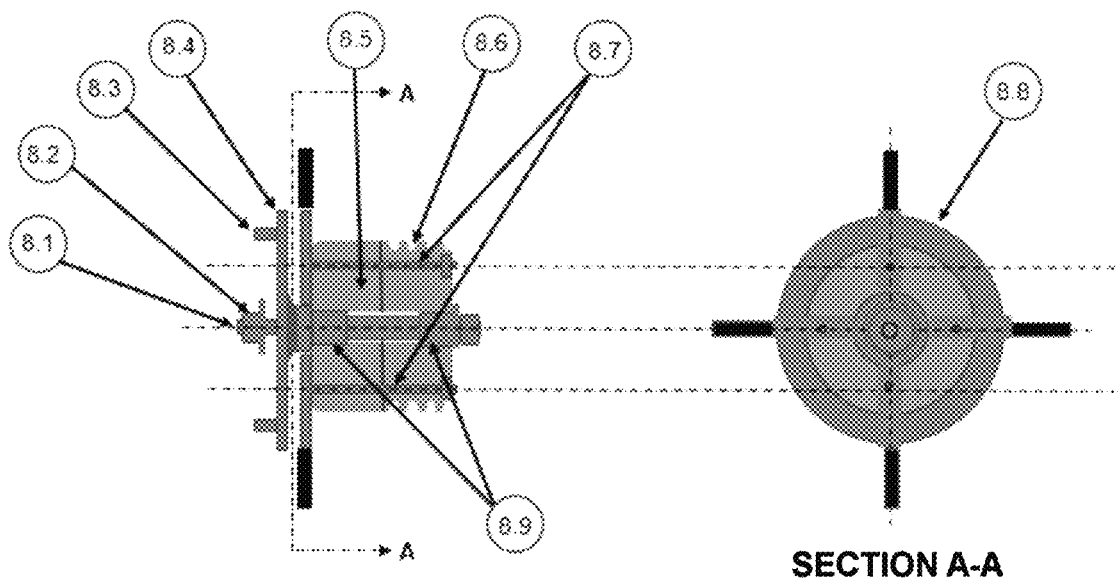
FIG. 8 representing the Attachment Device of the Cutting and Drawing Manual Orbital Machine of the PPS seen in section, which comprises the Shaft (8.1), the Attachment Nut (8.2), one of the Fitting Pins or Screws (8.3), the Cage Flange (8.4), the Fitting Cylinder in the PPS (8.5), the PPS Cover (8.6), the Link Tie Rods of the Cover with the PPS Fitting Cylinder (8.7), the Tiller (8.8) and the Shaft Bushings (8.9)
Figure 9:
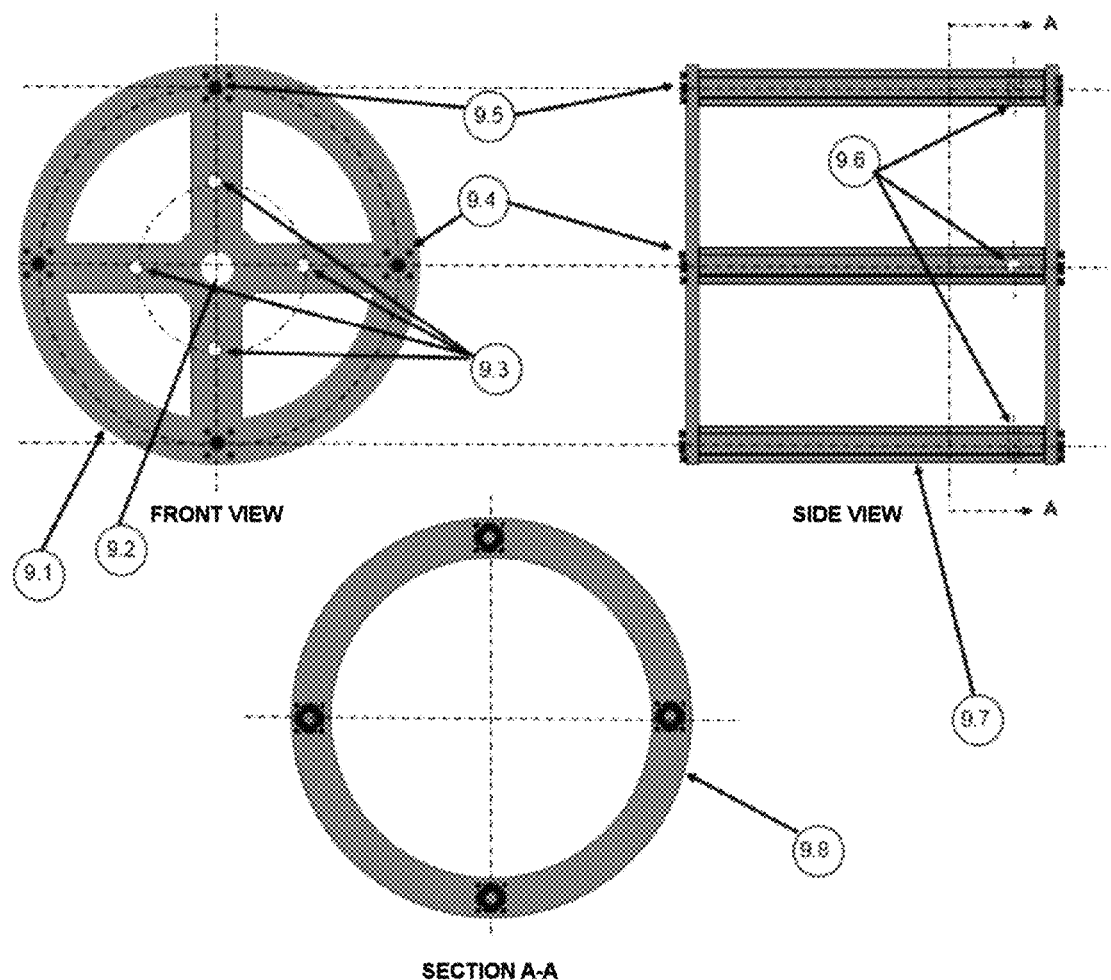
FIG. 9 representing the Cage of the Cutting and Drawing Manual Orbital Machine of the PPS, which comprises the Front Disc (9.1), the Fitting Hole in the Shaft (9.2), the Fitting Holes in the Pins or Screws of the Cage Flange (9.3), the Fitting Pins of the Bars (9.4), the Attachment Screws of the Bars (9.5), the Fitting Holes of the Support Wheels (9.6), one of the Bars (9.7) and the Rear Ring (9.8)

The Cutting and Drawing Manual Orbital Machine of the PPS, represented in FIGS. 7 to 9, is turned manually by the bars, or through an electrical, hydraulic or pneumatic mechanism coupled to the hexagon nut of the shaft. With a standard pneumatic, electric, or battery powered commercial screwdriver, it is possible to turn the mechanism.

The Cutting and Drawing Manual Orbital Machine of the PPS, represented in FIGS. 7 to 9, is portable and demountable, which facilitates its mobility and use in the field, in places of difficult access.

The beginning of the cut, using the Cutting and Drawing Manual Orbital Machine of the PPS, is done through a lever, called the PPS Cutting Lever, represented in FIGS. 3 (3.4), 5 (5.1) and 6 (6.2)), which moves the blade against the coating gradually deepening, while the machine rotates, until it touches the FBE layer (First Layer), represented in FIGS. 3 (3.12) and 5 (5.12), using it as a support. In this step, the lever is activated and the machine is rotated manually, to ensure operator safety and cutting precision. As soon as the blade touches the FBE layer, the system is locked by a Pin, represented in FIG. 4 (4.1). From then on, the operator no longer touches the lever and rotates the machine manually through the Bars, represented in FIGS. 7 (7.6) and 9 (9.7), positioning himself on the side, or using a screwdriver coupled to the Nut of the Shaft, represented in FIGS. 7 (7.4) and 8 (8.2), positioned in front of the machine. In this way, the cut, the FBE Exposure Band (FBE Tail) and the drawing of the PPS System are performed safely by only one operator.

The cutting speed depends on the material and thickness of the coating.

The PPS Cutting Blade, represented in FIGS. 3 (3.5), 4 (4.2), 5 (5.11) and 6 (6.3), is easily replaced by another sharpened or new one.

The sharpening angle of the PPS Cutting Blade and the lead angle make it possible to cut without tearing, fraying, glazing, wrinkling or becoming a paste, following a uniform line along the circumference of the pipe. That is, the finish of the cut results in a uniform and clean surface, maintaining the original characteristics of the applied coating, being superior to the finish generated in brushing.

The Preservation System for Coated Pipes for Onshore and Subsea Pipelines (PPS) disclosed in document BR102019015918-9 A2, called the PPS System, is unprecedented and, for this reason, the Cutting Machine described in this invention as well, since the system foresees the cut for its removal and the machine is designed for that purpose. There are several apparatuses, devices and machines for machining the FBE Exposure Band (FBE Tail); however, all use the Collar (Cutback) brushed or obtained by masking adhesive tape. In both cases, the machining of the external coating starts from the end of the pipe towards the center, being performed only in the manufacturer (coater), on straight pipes that rotate during cutting.

Figure 1:
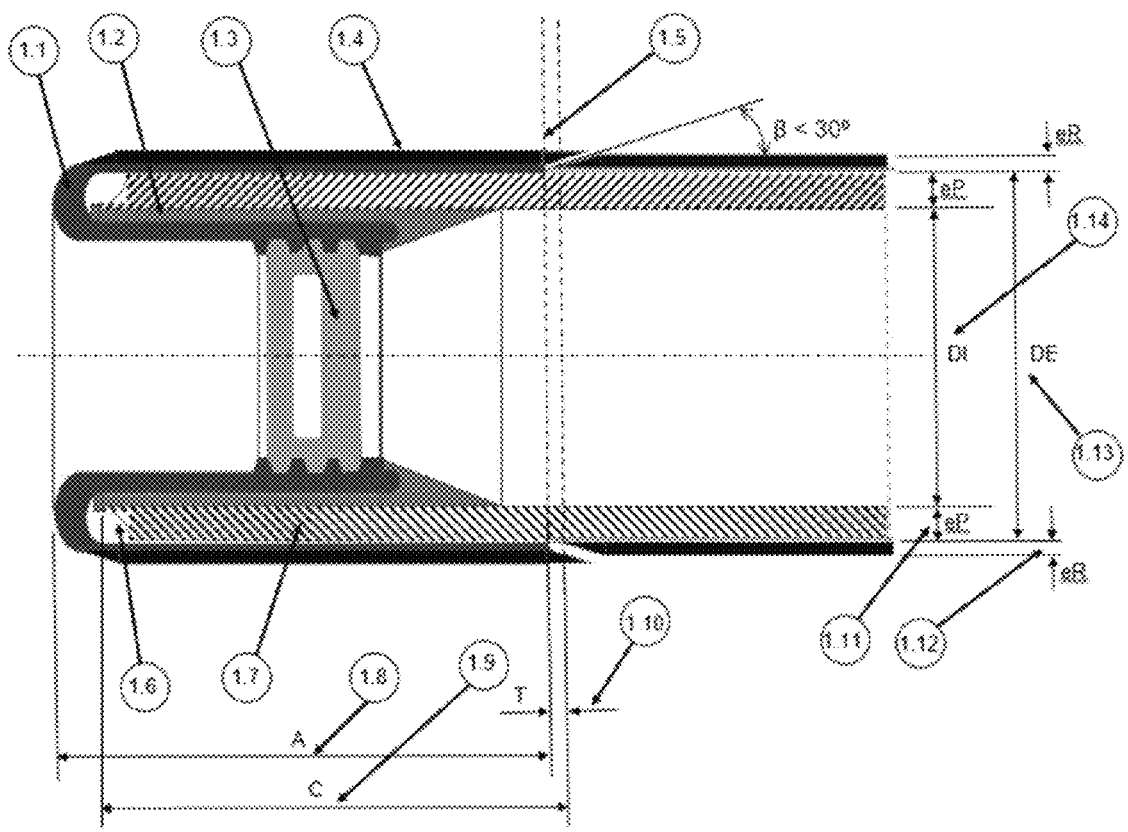
FIG. 1 representing a sectional view of the PPS System, comprising: the Cup (1.1), the Seal (1.2), the Cover (1.3), the External Coating (1.4), the Cutting Position and respective Angle (β) (1.5), the Bevel (1.6), the Wall of the Pipe (1.7), the Length (A) of the Outer Flap of the Cup (1.8), the Length (C) of the Collar (Cutback) (1.9), the Width (T) of the FBE Exposure Band (FBE Tail) (1.10), the Pipe Wall Thickness (eP) (1.11), the Total Coating Thickness (eR) (1.12), the Pipe Outer Diameter (OD) (1.13) and the Inner Diameter (ID) of the Pipe (1.14)

The technique evoked in this invention starts from the end of the External Flap of the Cup Component of the PPS System, represented in FIG. 1 (1.8) and encompasses three activities: making the cut of the external coating in order to obtain a chamfer with an angle smaller than 30°, represented in FIG. 2 (2.4), performing the FBE Exposure Band (FBE Tail), represented in FIG. 2 (2.3) simultaneously, quickly and accurately, and performing the quick draw of the PPS System, represented in FIGS. 1 (1.1), (1.2), (1.3), and (1.4), on the pipe bed, on the vessel, or on the onshore base (Spoolbase). The means currently available do not fulfill these functions together and are not performed in the field, on onshore bases (Spoolbases) or on the vessel.

The end of the External Flap of the Cup, represented in FIGS. 1 (1.8) and 3 (3.8), acts as a cutting facilitator, since it is not adhered to the surface of the Pipe, allowing the end of the Cutting Blade of the PPS lift the coating in this region, propagating along the circumference of the pipe.

Another unique feature of this invention is its applicability in static pipes, since the existing means are only applied in straight pipes that rotate during cutting.

The coupling of the Cutting and Drawing Manual Orbital Machine of the PPS is done in an unprecedented way using the cup fitting and the PPS System cover itself for alignment, positioning of the cut and drawing of the PPS System.

The Cutting and Drawing Manual Orbital Machine of the PPS, represented in FIGS. 7 to 9, is used in static (immovable) pipes during cutting, supported by shims at least 600 mm high and with at least 600 mm from the free end for coupling and operation. The Cutting Device represented in FIGS. 3 to 6 is called the PPS Cutting Device.

The Cutting and Drawing Manual Orbital Machine of the PPS, represented in FIGS. 7 to 9, is capable of cutting collars (Cutback) in the range of 80 to 200 mm in Length (C), represented in FIG. 2 (2.6), in default configuration. If there is a need for longer lengths, the Bars, represented in FIGS. 3 (3.3), 5 (5.4), 7 (7.6) and 9 (9.7) must be replaced by larger Bars up to a limit of 300 mm in collar (Cutback) length.

The range of Outer Diameters (OD), represented in FIG. 1 (1.13), of externally coated carbon steel pipes applicable to this invention is from 4½ to 32 inches (114.3 to 812.8 mm).

The Wall Thickness (eP) range, represented in FIG. 1 (1.11), of externally coated carbon steel pipes applicable to this invention is from ¼ to 2 inches (6.35 to 50.8 mm).

The range of Total External Coating Thickness (eR), represented in FIG. 1 (1.12), of Polyethylene in three layers (3-Layer PE) or Polypropylene in three layers (3-Layer PP) applicable to this invention is from 1.6 to 5 mm.

The Width (T) of the FBE Exposure Band (FBE Tail), represented in FIGS. 1 (1.10) and 2 (2.7), obtained by cutting, is from 1 to 5 mm, depending on the width, the angle of the sharpening of the coating cutting edge and the lead angle. The tolerance is quite open, with some specifications defining the range from 1 to 5 and others from 5 to 20 mm. The Width of the FBE Exposure Band (FBE Tail), (T), is inversely proportional to the total thickness of the pipe external coating.

Figure 10:
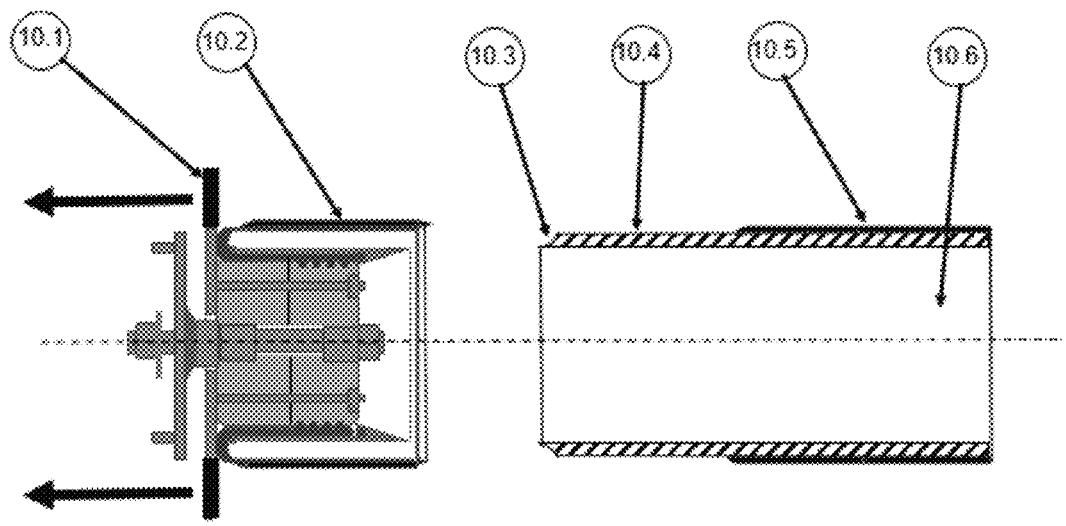
FIG. 10 representing a sectional view of the PPS System being drawn from the Pipe, after being cut using the Cutting and Drawing Manual Orbital Machine of the PPS, which comprises the Attachment Device (10.1), the PPS System (10.2), the Pipe Bevel (10.3), the Collar (Cutback) (10.4), the External Coating of the Pipe (10.5) and the Pipe (10.6)

The thickness range of the PPS Cutting Blade, represented in FIG. 10, applicable to this invention, is from 3 to 12 mm.

The essential condition is that the chamfer of the Collar (Cutback), (represented in FIG. 2 (2.4)) after the cut is at the correct angle ($\beta$), <30°, with a tolerance of +0-2°, its surface is smooth and uniform, its Length (C), represented in FIG. 2 (2.6), is in the specified measure, with a tolerance of ±5 mm, and the FBE Exposure Band (FBE Tail), represented in FIG. 2 (2.3), when specified by the buyer, be performed by removing the entire layer of Copolymeric Adhesive (second layer) without causing damage to the FBE, in the specified width (T).

The positioning of the cut is a function of the length (A) and the thickness of the External Flap of the Cup, represented in FIG. 1 (1.8), of the PPS System. The standard length (C) of the Collar (Cutback), represented in FIGS. 1 (1.9) and 2 (2.6), specified in ABNT NBR 15221-1 and 15221-2 Standards, for Polyethylene and Polypropylene in three layers, respectively, is 120±10 mm. However, the buyer can specify shorter or longer lengths, maintaining a tolerance of ±10 mm. The Cutting and Drawing Manual Orbital Machine of the PPS is capable of cutting collars (Cutback), as reported in the previous paragraph, with a tolerance of ±5 mm in the specified length, contributing to greater dimensional accuracy, favoring the effectiveness of the field joint coating process.

The PPS Cutting Device, represented in FIGS. 3 to 6, is the element that will house the PPS Cutting Blade, represented in FIGS. 3 (3.5), 4 (4.2), 5 (5.11) and 6 (6.3)), positioning it precisely and securely, and is made up of the following elements: the Body, represented in FIG. 3 (3.1), the Fitting Guide, represented in FIG. 3 (3.2), the PPS Cutting Blade Receptacle, represented in FIG. 3 (3.6) and the PPS Cutting Lever, represented in FIG. 3 (3.4).

Figure 4:
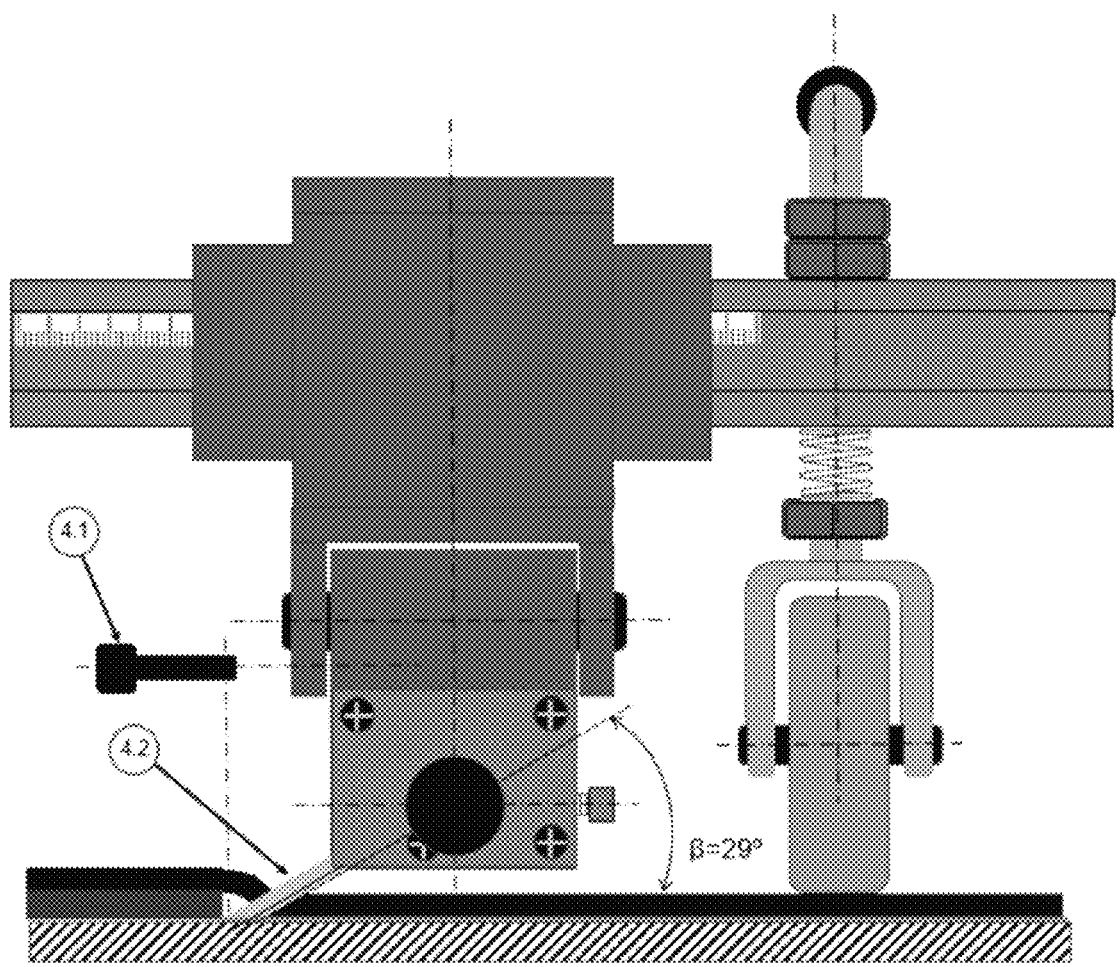
FIG. 4 representing a front view of the PPS Cutting Device with the Blade in the cutting position, which comprises the Lock Pin (4.1) and the PPS Cutting Blade (4.2)
Figure 5:
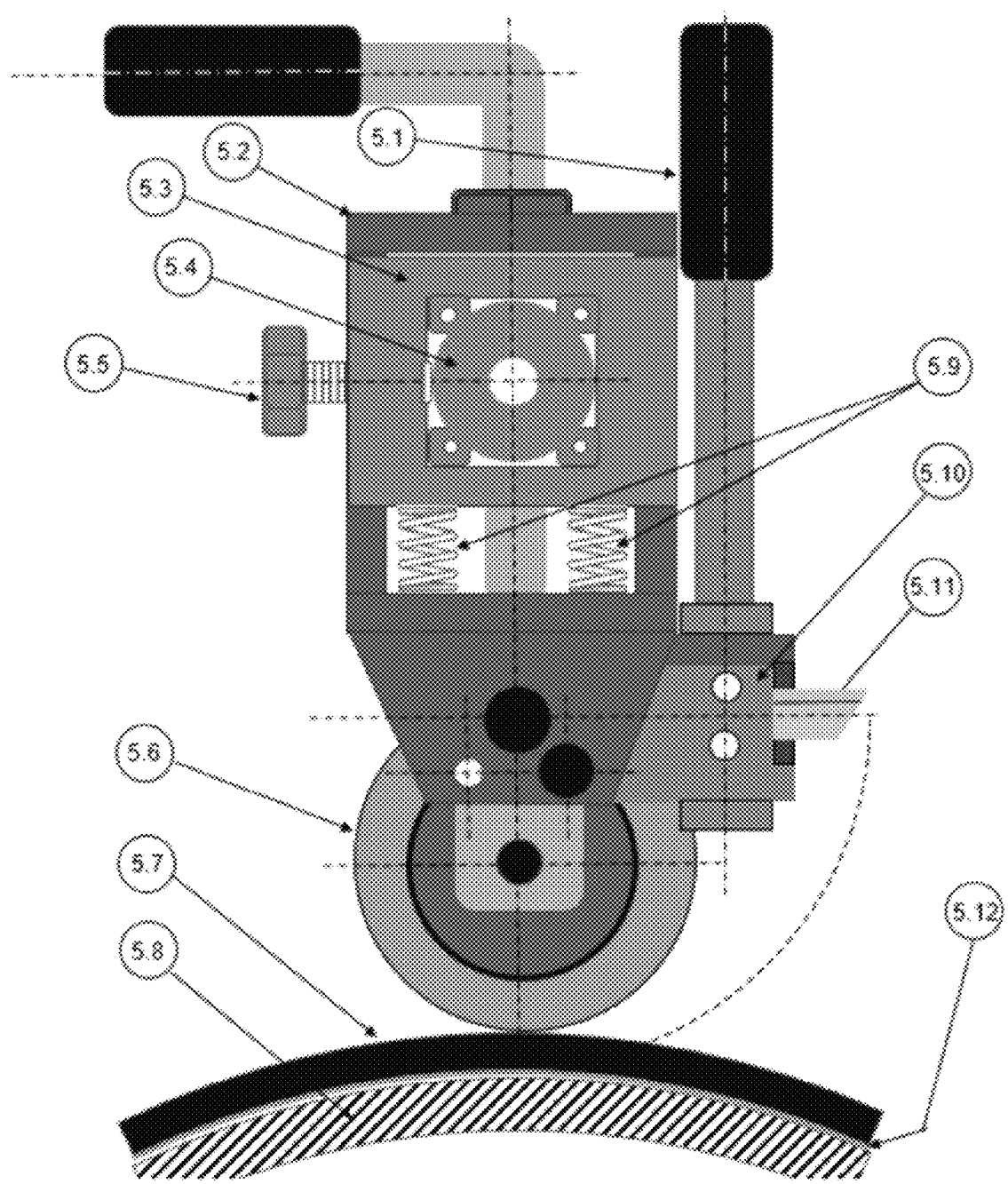
FIG. 5 representing a side view of the PPS Cutting Device with the PPS Cutting Blade in the retracted position, which comprises the PPS Cutting Lever (5.1), the Body (5.2), the Fitting Guide (5.3), the Bar (5.4), the Cutting Position Adjustment Screw (5.5), the Support Wheel (5.6), the External Pipe Coating (5.7), the Pipe Wall (5.8), the Adjustment Springs (5.9), the PPS Cutting Blade Receptacle (5.10), the PPS Cutting Blade (5.11) and the First Epoxy Layer (FBE) (5.12)

The PPS Cutting Device, represented in FIGS. 3 to 6, is attached to the Bar, represented in FIGS. 3 (3.3), 5 (5.4), 7 (7.6) and 9 (9.7) through the Setting Screws of the Cut Position, one of which is represented in FIG. 5 (5.5).

The Bar represented in FIGS. 3 (3.3), 5 (5.4), 7 (7.6) and 9 (9.7), made of extruded aluminum or a square profile of hollow laminated carbon steel, is the structural element to keep attached the PPS Cutting Device and its parallelism in relation to the pipe surface. It has a graduated scale in millimeters represented in FIG. 3 (3.3) to precisely position the PPS Cutting Device.

The PPS Cutting Blade Receptacle, in laminated carbon steel, is represented in FIGS. 3 (3.6) and 5 (5.10). This component is articulated through a lever that goes from the 0° position, fully retracted, represented in FIGS. 5 (5.1), to 90°, fully lowered, at the total cutting depth, represented in FIG. 6 (6.2). Also, it has a Pin to lock it in the desired position, represented in FIG. 4 (4.1). This receptacle can house the PPS Cutting Blade in either the left or right position and is, therefore, adaptable for both clockwise and counterclockwise rotation. It has 1 (one) or more PPS Cutting Blade attachment screws. It can be adjusted for blades from 3 to 12 mm thick and from 10 to 25 mm wide. It is already adjusted for the chamfer angle ($\beta$)=29°, but it can be customized for other angles, if necessary.

The Support Wheel, with the running part in polymeric material, so as not to damage the external coating to be cut, represented in FIGS. 3 (3.10), 5 (5.6) and 7 (7.9), is the support element of the Bar, represented in FIGS. 3 (3.3), 5 (5.4), 7 (7.6) and 9 (9.7), and serves to maintain the correct distance of the PPS Cutting Device in relation to the outer surface of the coating to be cut. It has a Spring, represented in FIG. 3 (3.11), to absorb impacts and conform to any imperfections that may exist on the coating surface to be cut and on the pipe. This Spring (3.11) is made of carbon steel with coefficient k dimensioned for this purpose, and can have its pressure adjusted through a Nut, as represented in FIG. 3.

The 2 (two) Cutting Position Setting Screws, made of laminated carbon steel, one of which is represented in FIG. 5 (5.5), are installed on the rear part of the Fitting Guide, represented in FIG. 3 (3.2) and serve to attach the same to the Bar, represented in FIGS. 3 (3.3) and 5 (5.4).

The Pin, represented in FIG. 4 (4.1) serves to attach the PPS Cutting Blade Receptacle in the desired position. There are two positions: 1—Retracted, represented in FIG. 5, and 2—Cut, represented in FIG. 6.

The Adjustment Springs, represented in FIGS. 5 (5.9) and 6 (6.1), serve to keep the blade pressed during cutting. They are carbon steel spiral springs with dimensions and coefficient k designed not to damage the Epoxy Layer (FBE). The number of springs can vary from 1 (one) to 6 (six).

The PPS Cutting Blade is made of laminated or forged carbon steel, with the faces to be sharpened (edges) hardened. The length of the hardening of the cutting edge of the external coating is a maximum of 25 mm. The thickness is from 3 to 12 mm, depending on the thickness and type of coating to be cut. The width of the blade is from 6 to 25 mm. The sharpening angle is defined according to the best cutting performance, being in the range of 15 to 35°. The lead angle is defined according to the difficulty of penetrating the PPS Cutting Blade in the coating to be cut, being in the range of 30 to 90°. The sharpening angle of the cutting edge of the FBE Exposure Band (FBE Tail) is greater than or equal to the angle of inclination of the PPS Cutting Blade ($\beta$). The Width (T) of the FBE Exposure Band (FBE Tail), described in FIG. 2 (2.7), is a function of the width of the blade, the sharpening angle, the chamfer angle ($\beta$) and the lead angle, being in the range of 1 to 5 mm per cut.

The PPS Cutting Blade, represented in FIGS. 3 (3.5), 4 (4.2), 5 (5.11) and 6 (6.3), may be heated by electrical resistance, electromagnetic induction, infrared, or other heat source, except by flame, in order to facilitate penetration and increase cutting speed. The temperature range, minimum and maximum, is defined according to the material of the coating to be cut. The heated blade can only touch the external coating during rotation. Therefore, it must be retracted, before the pipe or the machine stops turning, to prevent the generated heat from damaging the chamfer finish. The maximum temperature will always be 10% below the Softening Temperature (VICAT) of the third layer of the coating to be cut, which for Polyethylene (PE) is 115° C. and for Polypropylene (PP) is 145° C., according to Table A.3, of ABNT Standards NBR 15221-1 and 15221-2, respectively. Based on this premise, the temperature of the PPS Cutting Blade cannot be higher than 100° C. for Polyethylene (PE) and 130° C. for Polypropylene (PP).

The PPS Cutting Blade can be made using commercial materials, available in abundance on the market, such as standardized blades for stilettos, wood chisels and cutting tools for lathes, since the coatings are made of polymeric material, in this specific case, Polyethylene (PE) and Polypropylene (PP).

The Cut does not damage the PPS System Cup, represented in FIG. 1 (1.1), to allow its reuse and/or recycling, in order to respect the environment. All PPS System components will be reused and/or recycled.

The depth of the cut is a function of the Outer Diameter and the total thickness of the external coating of the pipe; therefore, the machines will be calibrated based on these parameters. The PPS Cutting Device has Adjustment Springs and Support Wheels, as represented respectively in FIGS. 5 (5.9) and (5.6). The support wheels maintain the positioning of the PPS Cutting Device Bar and the Adjustment Springs ensure that the PPS Cutting Blade is pressed onto the FBE Layer without pulling or damaging the same. The Adjustment Springs additionally have the purpose of allowing the PPS Cutting Blade to follow the surface imperfections and ovality eventually existing in the pipe, cushioning the shocks.

Figure 6:
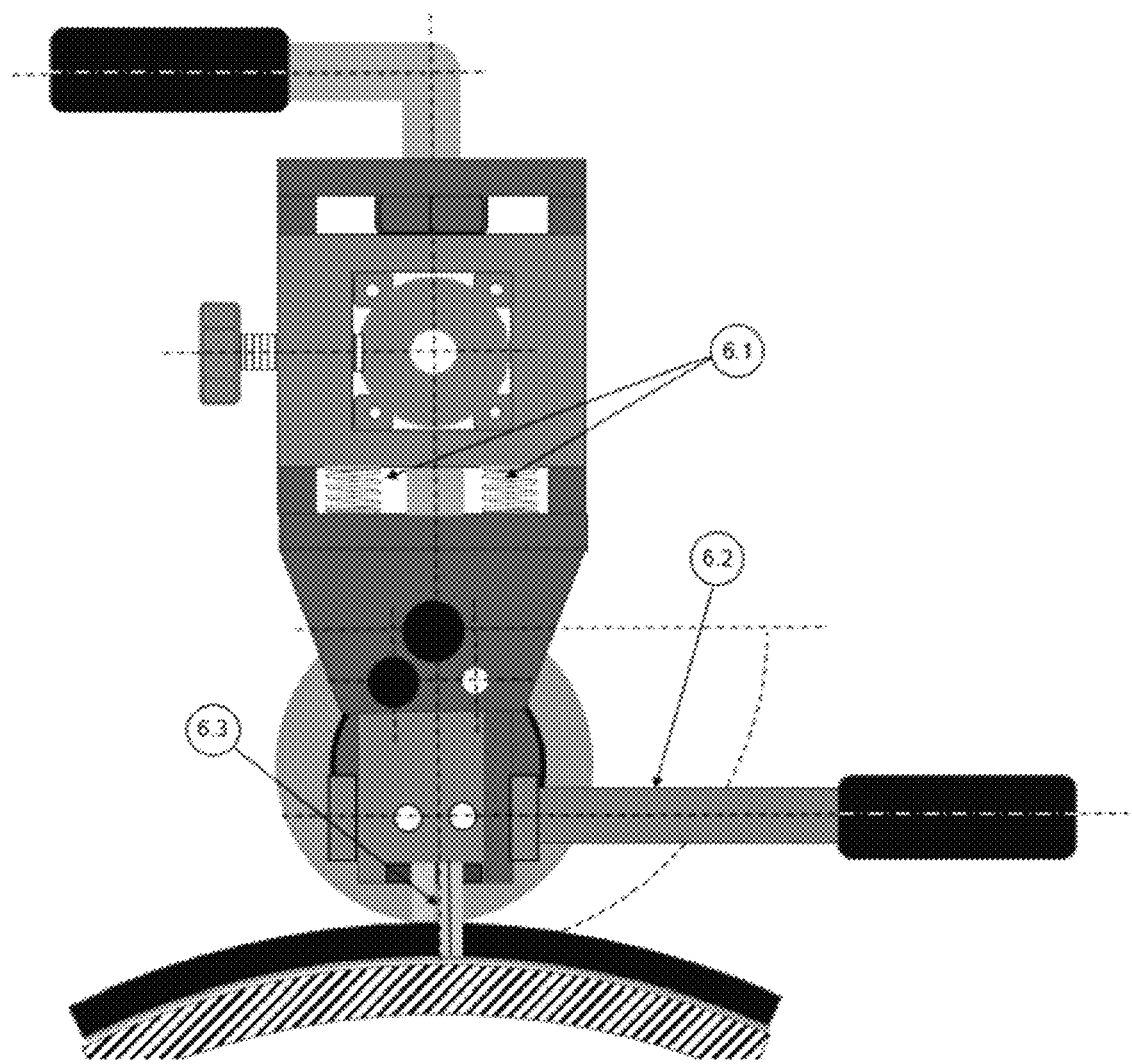
FIG. 6 representing a side view of the PPS Cutting Device with the blade in the cutting position, which comprises the Adjustment Springs (6.1), the PPS Cutting Lever (6.2) and the PPS Cutting Blade (6.3), all in the coating cutting position.

The cut is started with the PPS Cutting Blade (FIG. 6 (6.3)) facing the external coating of the pipe and, as the turn is developed, the depth is increased until the Blade touches the FBE Layer, as depicted in FIG. 6 (6.3). Therefore, the cut must overlap the initial area to ensure that the entire layer of adhesive over the FBE Exposure Band (FBE Tail) is removed and that the full depth of cut is achieved around the entire circumference of the pipe, allowing the drawing of the PPS system.

In some cases, depending on the thickness and material of the external coating, it may be necessary for the cut to be made in two or more steps, to obtain the specified width of the FBE Exposure Band (FBE Tail), represented in FIG. 2 (2.7). In this case, from the second step, one external coating ring will be generated per step. This ring will be sent for recycling, in line with the environmental care goals set forth in the PPS System.

The length of the PPS Cutting Lever represented in FIGS. 3 (3.4), 5 (5.1) and 6 (6.2), used in the PPS Cutting Device installed in the Cutting and Drawing Manual Orbital Machine of the PPS, allows the penetration of the PPS Cutting Blade easily, firmly and safely. This lever is threaded onto the PPS Cutting Device from both the front and rear parts, allowing cutting to be done for both clockwise and counterclockwise direction.

The PPS Cutting Device Bar, represented in FIGS. 3 (3.3), 5 (5.4), 7 (7.6) and 9 (9.7), has sufficient rigidity to maintain parallelism with respect to the pipe surface and withstand the torsion and bending moments of the PPS Cutting Device, during the cutting operation.

The Cutting and Drawing Manual Orbital Machine of the PPS, represented in FIGS. 7 to 9, has a configuration for each Nominal Pipe Diameter (DN) and is named according to this diameter. Example: Cutting and Drawing Manual Orbital Machine of PPS 4, for cutting static (immovable) pipes with Nominal Diameter (DN) equal to 4 and Cutting and Drawing Manual Orbital Machine of PPS 16 for DN equal to 16.

The Cutting and Drawing Manual Orbital Machine of the PPS, represented in FIG. 7, is made up of the following elements: the Cage, represented in FIG. 9, which is made up of the following structural elements: The Front Disc, represented in FIG. 9 (9.1), in laminated carbon steel or aluminum, which has a Central Hole, represented in FIG. 9 (9.2), to fit the Attachment Device Shaft, represented in FIG. 8 (8.1), and Holes, represented in FIG. 9 (9.3), to fit the Cage Flange Pins or Screws (8.4), represented in FIG. 8 (8.3). This Front Disc is attached to the shaft by a Nut, in carbon steel, represented in FIG. 7 (7.4) and FIG. 8 (8.2). There is also the Rear Ring, represented in FIG. 9 (9.8), in laminated carbon steel or aluminum, and the Bars, represented in FIG. 9 (9.7), in extruded aluminum or hollow square profile of laminated carbon steel. This is the structure of the Cutting and Drawing Manual Orbital Machine of the PPS. In the Holes represented in FIG. 9 (9.6), the Support Wheels represented in FIG. 7 (7.9) are attached. The PPS Cutting Device represented in FIG. 7 (7.3) is attached to one of the Bars, represented in FIGS. 7 (7.6) and 9 (9.7). The Cage is demountable, being only necessary to loosen and remove the Screws represented in FIG. 9 (9.5).

The Attachment Device, represented in FIG. 8, consists of the following elements: The Cage Flange represented in FIG. 8 (8.4), made of laminated carbon steel, is attached to the Shaft represented in FIG. 8 (8.1) and has Pins or Screws, represented in FIG. 8 (8.3), for coupling the Cage Front Disc represented in FIG. 9 (9.1). The Tiller, made of laminated carbon steel, represented in FIG. 8 (8.8), is connected to the Fitting Cylinder represented in FIG. 8 (8.5) by Tie Rods made of laminated carbon steel, represented in FIG. 8 (8.7).

The Fitting Cylinder, represented in FIG. 8 (8.5), made of the same polymeric material as the PPS System Cover, will be machined to compose a set with the Cover, represented in FIG. 8 (8.6) and house the Shaft Bushings represented in FIG. 8 (8.9). The Shaft, represented in FIG. 8 (8.1), made of laminated carbon steel, in solid cylindrical or tubular shape, with an Outer Diameter sized according to the Outer Diameter of the pipe to be cut.

The pipes may have the same Outer Diameter; however, with different Wall Thicknesses (eP), represented in FIG. 1 (1.11). Consequently, the Inner Diameter of the Cup component, represented in FIG. 1 (1.1) and the Outer Diameter of its respective Cover, represented in FIG. 1 (1.3) must be specific for each thickness. Based on this premise, a Fitting Cylinder, represented in FIG. 8 (8.5) for each thickness, should be machined, since this component forms a set with the PPS System Cover, represented in FIG. 8 (8.6). For this reason, the Tie Rods represented in FIG. 8 (8.7) are positioned in such a way on the Tiller, represented in FIG. 8 (8.8), that it is possible to install the Cover and Cylinder for any pipe thickness in the range of ¼ to 2 inches (6.35 to 50.8 mm), by loosening only the attachment nuts of the Tie Rods. In this way, the only components that need to be changed, depending on the Pipe wall thickness, are the Fitting Cylinder (8.5) and the Cover (8.6), in a practical and economical way.

The Cutting and Drawing Manual Orbital Machine of the PPS is rotated through electrical, hydraulic, or pneumatic tools or devices coupled to the hex Nut of the shaft, represented in FIG. 7 (7.4). With a pneumatic, electric or battery screwdriver, it is possible to turn the machine, for pipes with Nominal Diameter (DN)≤10.

For pipes with DN 12 to 32, using the Cutting and Drawing Manual Orbital Machine of the PPS, it is necessary to use a reduction mechanism, in order to reduce the effort and increase the operator's safety to rotate the Cage represented in the FIG. 9. This mechanism, called Reducer Arm, comprises the Reducer, represented in FIG. 11 (11.1) and the Support Bar on the ground (11.2). The Reducer (11.1), with a minimum reduction of 2:1, is coupled to the hex Nut represented in FIG. 7 (7.4). The Screwdriver is attached to the nut of the Reducer. The Support Bar on the ground (11.2) is telescopic to adjust to the height of the Center Line of the pipe and serves to support the Reducer (11.1) and keep the system firm and aligned. This bar must be installed with an inclination of 45±10° in relation to ground level, on the left side (E), for counterclockwise rotation and on the right side (D), for clockwise rotation, as represented in FIG. 11.

The Cutting and Drawing Manual Orbital Machine of the PPS, represented in FIGS. 7 to 9, can be rotated manually, regardless of the Nominal Diameter (DN) of the Pipe. In this condition, the operator will position himself on the side of the Cage represented in the Side View of FIG. 9 and, initially with one of his hands, he will pull the bar in the direction of the cut and with the other he will activate the cutting lever until reaching the total depth of cut, then attach the Cutting Device with the Pin represented in FIG. 4 (4.1) and continue turning the Cage until completing the entire cut. This functionality is to facilitate its use in the field.

The Cutting and Drawing Manual Orbital Machine of the PPS is designed to be transported and stored in parts, which are: the Attachment Device, represented in FIG. 8, the Front Disc, represented in FIG. 9 (9.1), the Ring Rear, represented in FIG. 9 (9.8), the Bars, represented in FIG. 9 (9.7), the Support Wheels, represented in FIG. 7 (7.9), the Cutting Device, represented in FIG. 7 (7.3), and the Attachment Screws of the Bars, represented in FIG. 9 (9.5). For cutting the external coating of Pipes with Nominal Diameter (DN) >10, it will be necessary to include the Reducer Arm represented in FIG. 11.

The assembly of the Cutting and Drawing Manual Orbital Machine of the PPS, represented in FIGS. 7 to 9, begins when the Attachment Device, represented in FIG. 8 is firmly connected to the Pipe Mouth, using the Handles of the Tiller, represented in FIG. 8 (8.8). Next, the Cage, represented in FIG. 9, is installed on the Cage Flange, represented in FIG. 8 (8.4), with the PPS Cutting Device, represented in FIGS. 3 to 6, already installed on the Bar (which has a scale in millimeters), represented in FIG. 3 (3.3), in the retracted position, and the Support Wheels, represented in FIGS. 3 (3.10), 5 (5.6) and 7 (7.9), installed, each one on its respective Bar, with its Levers, represented in FIG. 7 (7.10), parallel to the Center Line of the Bars, so that they rotate on the surface of the Pipe, in the longitudinal direction, facilitating the coupling. Next, the nuts are placed and tightened on the corresponding screws of the Cage Flange (8.4). Then, the Support Wheels, represented in FIGS. 3 (3.10), 5 (5.6) and 7 (7.9), are turned to rotate in the circumferential direction of the Pipe, through their respective levers and are adjusted, if necessary, to guarantee the parallelism of the Center Line of the Bars with the Center Line of the Pipe.

The invention claimed is:

1. A cutting and drawing manual orbital machine of a pipe preservation system (PPS), comprising:
   an attachment device comprising:
     a shaft;
     a fitting cylinder concentric to the shaft and configured to be inserted into a PPS system cup; and
     a cage flange coupled to the shaft and positioned forward of the fitting cylinder;
   a cage removably coupled to the cage flange, the cage comprising a bar perpendicular to the cage flange and parallel to a central axis of the fitting cylinder;
   a cutting device removably coupled to the bar and positioned rearward of the fitting cylinder, the cutting device comprising:
     a cutting blade positioned at a chamfer angle;
     a cutting lever, wherein the cutting lever is configured to rotate the cutting blade a retracted position to a lowered position; and
     a pin configured to lock the cutting blade in either the retracted position or the lowered position;
   a support wheel removably coupled to the bar and positioned rearward of the fitting cylinder; and
   a reducer arm coupled to the shaft.

2. The cutting and drawing manual orbital machine of claim 1, wherein the attachment device further comprises a PPS system cover positioned against a rearward surface of the fitting cylinder, an attachment nut coupling the reducer arm to the shaft, one or more shaft bushings positioned concentrically between the shaft and the fitting cylinder and the shaft and the PPS system cover.

3. The cutting and drawing manual orbital machine of claim 2, wherein the fitting cylinder is removably coupled to the shaft.

4. The cutting and drawing manual orbital machine of claim 2, wherein the cutting device is slidably coupled to the bar such that the cutting device is configured to move forward or rearward.

5. The cutting and drawing manual orbital machine of claim 4, wherein the reducer arm comprises a reducer coupled to the attachment nut, and a support bar, wherein the reducer has a minimum reduction of 2:1, and the support bar is configured to contact a ground surface and support the cutting and drawing manual orbital machine.

6. The cutting and drawing manual orbital machine of claim 5, wherein the attachment nut comprises a hexagonal shape and a locking system configured to removably couple to manual, electric, pneumatic, or hydraulic tools.

7. The cutting and drawing manual orbital machine of claim 6, wherein the reducer comprises a hexagonal shape and a locking system configured to removably couple to manual, electric, pneumatic, or hydraulic tools.

8. The cutting and drawing manual orbital machine of claim 4, wherein the attachment device further comprises a tiller positioned rearward of the fitting cylinder and one or more link tie rods coupling the tiller to the fitting cylinder to the PPS system cover.

9. The cutting and drawing manual orbital machine of claim 8, wherein the shaft and the cage flange are configured to jointly rotate.

10. The cutting and drawing manual orbital machine of claim 9, wherein the tiller, the fitting cylinder, and the PPS system cover are configured to jointly rotate.

11. The cutting and drawing manual orbital machine of claim 10, wherein the tiller comprises one or more handles.

12. The cutting and drawing manual orbital machine of claim 4, the cage further comprising a cage front disc coupled to the cage flange, wherein the bar is coupled to the cage front disc.

13. The cutting and drawing manual orbital machine of claim 12, wherein the cage further comprises one or more additional bars perpendicular to the cage flange and spaced circumferentially apart from the bar around the cage front disc, an additional support wheel removably coupled to each additional bar.

14. The cutting and drawing manual orbital machine of claim 13, wherein the cage front disc comprises a central hole configured to receive the shaft and a plurality of holes configured to receive an attachment element of the cage flange spaced radially away from the central hole.

15. The cutting and drawing manual orbital machine of claim 13, further comprising a cage rear ring coupled to a rear end of the bar and the one or more additional bars.

16. The cutting and drawing manual orbital machine of claim 13, wherein the bar and the one or more additional bars each comprises one or more holes configured to removably coupled the support wheel or one of the additional support wheels to the bar.

17. The cutting and drawing manual orbital machine of claim 13, wherein the support wheel and each of the additional support wheels comprises a polymeric contact surface configured to contact a surface of the PPS.

18. The cutting and drawing manual orbital machine of claim 17, wherein the support wheel comprises a lever configured to rotate the support wheel from a parallel orientation relative to the bar to a circumferential position relative to the fitting cylinder.

19. The cutting and drawing manual orbital machine of claim 18, wherein the support wheel comprises a spring configured to dampen the support wheel relative to the bar.

\* \* \* \* \*